US009906639B1

(12) United States Patent
Lutey

(10) Patent No.: US 9,906,639 B1
(45) Date of Patent: Feb. 27, 2018

(54) WIRELESS PROGRAMMABLE MEASURING TAPE

(71) Applicant: Diane Lutey, Bellbrook, OH (US)

(72) Inventor: Diane Lutey, Bellbrook, OH (US)

( * ) Notice: Subject to any disclaimer, the term of this patent is extended or adjusted under 35 U.S.C. 154(b) by 0 days.

(21) Appl. No.: 15/246,839

(22) Filed: Aug. 25, 2016

(51) Int. Cl.
*H04M 1/725* (2006.01)
*H04M 1/00* (2006.01)
*H04B 1/38* (2015.01)
*H04W 4/00* (2018.01)

(52) U.S. Cl.
CPC ....... *H04M 1/72527* (2013.01); *H04W 4/005* (2013.01); *H04W 4/008* (2013.01)

(58) Field of Classification Search
CPC ................................................. H04M 1/72527
USPC .......................................................... 455/557
See application file for complete search history.

(56) References Cited

U.S. PATENT DOCUMENTS

| 2,696,695 | A | | 12/1954 | Decker |
| 3,040,474 | A | | 6/1962 | Sirks |
| 4,185,390 | A | * | 1/1980 | Tateishi ............... G01B 3/1084 33/762 |
| 4,299,394 | A | | 11/1981 | Greenspan |
| 5,396,578 | A | * | 3/1995 | Howes ................. G01B 3/1084 33/760 |
| 6,082,017 | A | | 7/2000 | Simar |
| 6,520,828 | B2 | | 2/2003 | Ferrigno |
| 7,496,407 | B2 | * | 2/2009 | Odderson .......... A61B 5/04001 33/760 |
| 2005/0148898 | A1 | * | 7/2005 | Odderson .......... A61B 5/04001 600/544 |
| 2012/0016259 | A1 | * | 1/2012 | Odderson .......... A61B 5/04001 600/554 |
| 2012/0046572 | A1 | * | 2/2012 | Odderson .......... A61B 5/04001 600/554 |

FOREIGN PATENT DOCUMENTS

JP          H10227601 A    8/1998

* cited by examiner

*Primary Examiner* — Tilahun B Gesesse
(74) *Attorney, Agent, or Firm* — R. William Graham

(57) ABSTRACT

A measuring tape for emitting a novelty sound includes a housing having a incrementally marked tape operably wound therein, a first end of the tape secured to an inner housing part with biasing member, an intermediate portion being wound about itself, and a second end extending outside a slot in the housing and includes an angled member to maintain the second end from reentering the housing, an activation device, a speaker operably disposed on the housing, an electronic device operably disposed in the housing and is configured for receiving and/or storing an audio data signal, the electronic device is responsive to the activation device and operably connected thereto, the electronic device for providing the received and/or stored audio data signal to the audio speaker operably connected to the housing, and a power source operably connected to the electronic device and the speaker.

6 Claims, 2 Drawing Sheets

WIRELESS PROGRAMMABLE MEASURING TAPE

TECHNICAL FIELD

The present invention relates to measuring tapes. More particularly, the invention relates to a measuring tape with electronic digital storage and playback capabilities for emitting sounds.

BACKGROUND

Traditionally, measuring tapes are provided for functionally measuring the length of an object. Measuring tapes exist with means for emitting a unit measure as a function of the final measured length are known. Typically these employ a button which is depressed once the measure is final and then an audio or visual readout occurs. Other tapes emit a noise once the tape portion reaches near the end of the tape to avoid the destruction of the tape itself.

While the above features provide some use advantages over conventional measuring tapes, there is a need to provide a measuring tape with a novel amusement aspect as well as multiple functional aspect. Accordingly, the invention addresses measuring tapes in this regard for improvement thereof.

SUMMARY

It is an object of the invention to improve measuring tapes.

It is an object to enhance novelty features of measuring tapes.

A further object is to provide multiple functionality to conventional measuring tapes.

Accordingly, the present invention is directed to a measuring tape for emitting a novelty sound or music. The tape includes a housing having a incrementally marked tape operably wound therein. A first end of the tape secured at a central area of an inner housing part with a spring or biasing member, and an intermediate portion being wound about itself. A second end extends outside a slot of the housing and includes an angled member to maintain the second end from reentering the housing.

A electronic device, e.g., writable microprocessor and memory chip, is located in the housing and is configured for receiving and/or storing audio data, such as sound segment data, which can for example, mimic a whistle, a fog horn, or be music segment either in stored or streamed format. The electronic device is responsive to an activation device, for example a sensor which is responsive to movement of the tape, and for providing the received and/or stored audio data to one or more audio speaker which is operably connected to the housing and which is in turn responsive to the activation device. The activation device can also be programmed to terminate the transmission of the received and stored audio data signal to the audio speaker. The audio speaker(s) are electronically coupled to the writable, electronic device and configured for playing audio data signal received from the writable, electronic device. A power source, such as rechargeable battery, is operably connected to the electronic device located in the measuring tape, and configured for providing power to the electronic device. A charging port can be configured within the housing and operably connected to the electronic device for recharging the battery.

A wireless communication device, such a Blue Tooth, Bluetooth AptX device or AirPlay technology (if a wifi network is available), can be operably connected to the electronic device for receiving an audio data signal electronic data in a streamed format, generally securely electronically coupled to the electronic device, for electronically transmitting data. The electronic storage device can receive audio data wirelessly from a device such as a computer, a CD player, an MP3 player a smart phone and/or the like equipped with a wireless transmitter.

There can also be an audio in port electrically connected to the electronic device for wired transfer of audio data. There can be provided a data electronic cable configured for allowing the source of audio data to download audio data to be received by and stored on the electronic device or streamed to the speaker(s), the audio data electronic cable being further configured for being easily uncoupled from the electronic device on demand of a user.

The power source is preferably a small lithium rechargeable battery while the source of audio data signal may be selected from the group consisting of a computer, a CD player, an MP3 player and a smart phone while the audio data may include one or more files selected from the group consisting of audio, voice, music or sound files. Additionally, there can be a microphone operably connected to the electronic device to permit recording a message or uniquely recorded sound data.

The measuring tape can be configured to play a prerecorded sound or audio message which plays upon pulling the second end measuring tape via software known in the art for designating a particular audio clip, similar to a designated ringtone. The housing can include a switch, for turning on/off the electronic storage device.

Thus the measuring tape has the ability to play audio in a streamed or downloaded format. By so providing, those who work in trades which commonly require use of a measuring tape, can have a tape which also serves a pleasing audio effect. Take for example, framers or builders who continuously use tapes during construction, now the tape serves not only its convention measuring function, but also provides novel audio feature capability and further serves the continuous locating ability by virtue of the sound it emits while in use.

It is important to note that the present invention is not intended to be limited to a the particular orientation of the above described example to satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
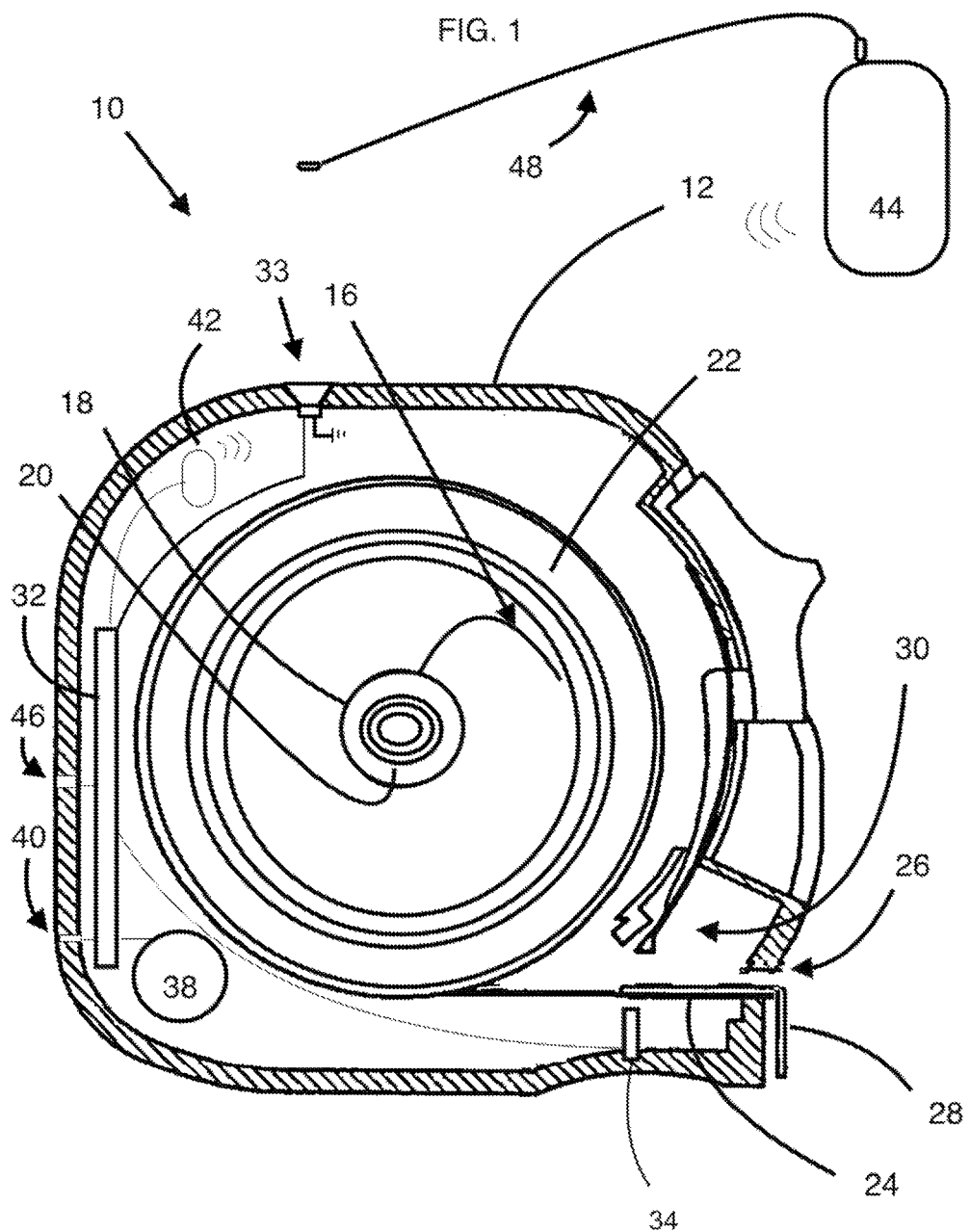
FIG. 1 is a sectional schematic view of a measuring tape in accordance with the present invention in a stored mode.
Figure 2:
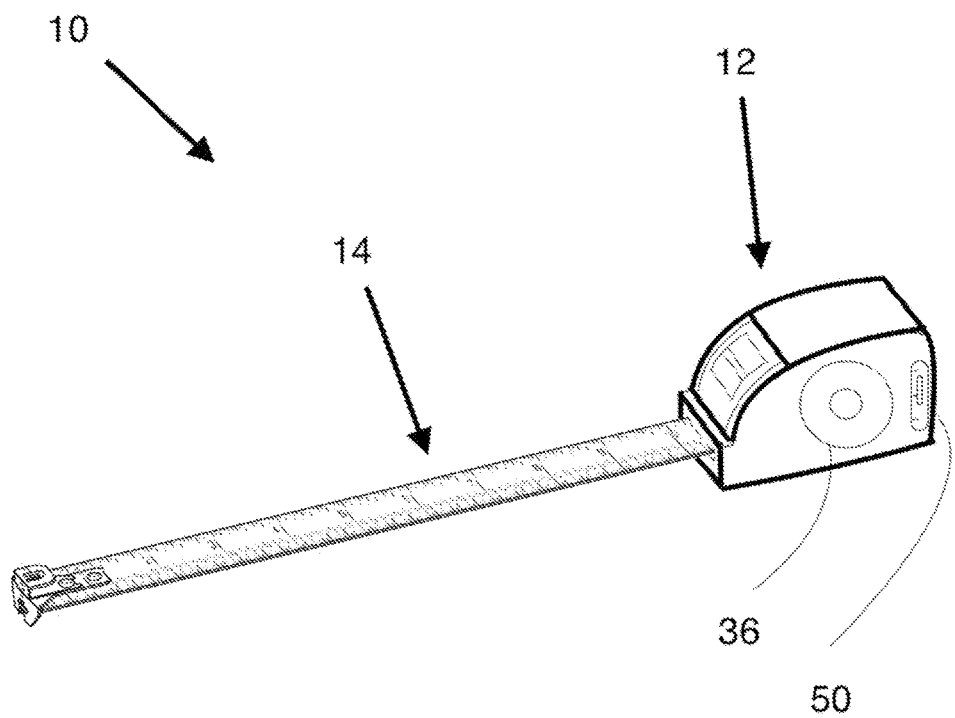
FIG. 2 is a perspective view of a measuring tape in accordance with the present invention in an extended mode.

Referring now to the drawings, the measuring tape of the present invention generally is designated by the numeral 10.

The measuring tape 10 can include a housing 12 having a incrementally marked coiled tape 14 operably wound therein. A first end 16 of the tape secured at a central area of an inner housing part 18, such as a bobbin, which is centrally placed in the housing 12 with a spring or biasing means 20 to cause the bobbin 18 to return to its preset orientation upon being forcibly rotated out of its normal resting position. A intermediate portion 22 of the coiled tape 14 being wound about the bobbin 18 and itself. A second end 24 extends outside a slot 26 of the housing 12 and includes an angled member 28 to maintain the second end 24 from reentering the housing 12.

When the tape 14 wound around a bobbin 18 set in the housing 12 is pulled out through the slot 26 formed on the lower portion of the housing 12, a stopper or locking member 30 as is known in the art can be employed to locked the tape 14 in position by a frictional force.

A electronic device 32, e.g., writable microprocessor and memory chip, is located in the housing 12 and is configured for receiving and/or storing audio data, such as a sound segment data, which can for example, mimic a whistle, a fog horn, or be music segment either in stored or streamed format. Additionally, there can be a microphone 33 operably connected to the electronic device 32 to permit recording and storing a message or uniquely recorded sound data. The electronic device 32 is responsive to an activation device 34, which can be sensor, which is responsive to movement of the tape 14, for example, providing the initiation of received and/or stored audio data to one or more audio speaker 36 operably connected to the housing 12 and which is responsive to the activation device 34. In one embodiment, the return of the tape 14 to its normally stored position as seen in FIG. 1, closes or terminates transmission of the received and stored or audio data to the audio speaker.

The audio speaker(s) 36 are electronically coupled to the electronic device 32 and configured for playing audio data received from the electronic device is provided. A power source 38, such as rechargeable battery, is operably connected to the electronic storage device 32 located in the measuring tape housing 12 and configured for providing power to the electronic device 32. A charging port 40, such as a USB port, can preferably be configured within the housing 12 and operably connected to the electronic device 32 for supplying power and/or recharging the battery 38. This provides for AC or DC power sources to be used.

A wireless communication device 42, such a Blue Tooth, Bluetooth AptX device or AirPlay technology (if a wifi network is available), can preferably be operably connected to the electronic storage device 32 for receiving an audio data electronic data in a wireless (streamed) format, generally securely electronically coupled to the electronic device 32, for electronically transmitting data. The electronic device 32 can receive audio data wirelessly from a device 44 such as a computer, a CD player, an MP3 player a smart phone and/or the like equipped with a wireless transmitter.

There can also be an audio in port 46 electrically connected to the electronic device 32 for wired transfer of audio data. There can be provided a data electronic cable 48 configured for allowing the source of audio data to download audio data to be received by and stored on the electronic device 32 or streamed to the speaker(s) 36, the audio data electronic cable being further configured for being easily uncoupled from the electronic device 32 on demand of a user.

The power source 38 can preferably be a battery, such as a small lithium rechargeable battery, while the source of audio data may be selected from the group consisting of a computer, a CD player, an MP3 player and a smart phone while the audio data may include one or more files selected from the group consisting of audio, voice, music or sound files.

The measuring tape 10 can be configured to play a prerecorded sound or audio message which plays upon pulling the second end 24 of measuring tape 10 via software known in the art for designating a particular audio clip, similar to a designated ringtone. The housing 12 can include a switch 50, (e.g. slide switch) for turning on/off the electronic device 32 and/or choosing between wireless and wired communication.

The electronic device 32 also called a recordable chip is coupled to an activation device 34, which can be sensor or sliding lever which is triggered by movement of the tape 14, for example, providing the initiation of received and/or stored audio data to one or more audio speaker 36 operably connected to the housing 12 and which is responsive to the activation device 34. As an example, there device 34 can include a pressure sensitive element, optical element or any other device that can detect some activation or movement of the measuring tape 14 to signal that the audio data recorded on the electronic device 32 should begin to play, and which subsequent movement, a predeterm ined period of time or the de-activation of the activation device 34 can also signal when the electronic device 32 should stop playing the audio data.

In accordance with the present invention, the electronic device 32 can be, in one embodiment, connected either directly via wireless device 42 or indirectly to via cable 48 via audio in port 46 which allows the electronic device 32 to be connected to electronic device 44 such as a computer, CD player, MP3 player, Smart phone or other similar processing device. The cable 48 is preferably supplied with the measuring tape 10. As mentioned, the electronic device 32 may be provided as part of a circuit, that is equipped with a wireless receiver device 42, as described above, such as a blue tooth receiver or the like, to enable electronic device 44 to transmit user recorded or assembled audio data signal wirelessly to the electronic device 32 for streamed or later playback, as described herein.

The electronic device 32 permits a user to select one or more prerecorded music, voice or sound files which the user himself or herself has recorded or which the user has downloaded and stored on the electronic device 44. The user may select a single file or the user may combine together multiple files.

In this configuration, the electronic device 32 functions with the electronic device 44 as a plug-and-play storage device that allows a user to select a file or files of proper size which will fit on the electronic device 32 and transfer them from the electronic device 44 to the electronic device 32 using the supplied cable 48 or wireless device 42. The cable 48 may be a reusable cable such as a USB, firewire, serial or other currently accepted standard connectable data communication cable. The cable 48 may include a standard type connector presently available or of a standard which is not yet available or developed. Any connector provided should have a profile that fits within a suitable input port 46 the housing 12.

In this manner and utilizing the system and method of the present invention, a user may create or select one or more voice files, music files, or audio files from the electronic device 44; download the file(s) to the electronic device 32 using a cable 48 or wireless device 42; and subsequently disengage the download cable 48, resulting in a traditional functioning measuring tape 10 with the added benefit of a customized, audio message or streamed audio that plays when the measuring tape 10 opens or when the switch 50 is moved to an audio on position (wireless or wired mode), wherein the switch 50 can include multiple operably positions.

The measuring tape 10 has the ability to play audio in a streamed or downloaded format. By so providing, those who work in trades which commonly require use of a measuring tape, can have a tape which also serves a pleasing audio effect. Take for example, framers or builders who continuously use tapes during construction, now the tape serves not only its convention measuring function, but also provides novel audio feature capability and further serves the continuous locating ability by virtue of the sound it emits while in use.

The present invention is not intended to be limited to a device to satisfy one or more of any stated or implied objects or features of the invention and should not be limited to the preferred, exemplary, or primary embodiment(s) described herein. Modifications and substitutions by one ordinary skill in the art are considered to be within the scope of the present invention which is not to be limited except by the allowed claims and their legal equivalents.

What is claimed is:

1. A measuring tape for emitting a sound, which includes:
   a housing having a incrementally marked tape operably wound therein, a first end of said tape secured to an inner housing part with biasing member, an intermediate portion being wound about itself, and a second end extending outside a slot in said housing and includes an angled member to maintain said second end from reentering said housing;
   a speaker operably disposed on said housing;
   an electronic device operably disposed in said housing and is configured for receiving and/or storing an audio data signal, said electronic device for providing said received and/or stored audio data signal to said audio speaker operably connected to said housing;
   a wireless communication device operably connected to said electronic device for receiving said audio data signal;
   a power source operably connected to said electronic device and said speaker; and
   an activation device disposed within said housing including a sensor which is responsive to movement of said tape causing said electronic device to transmit said received and/or stored audio data signal to said audio speaker to produce audible emission thereof.

2. The measuring tape of claim 1, said power source includes one of a direct current and alternating current power source.

3. The measuring tape of claim 2, wherein said power source is a rechargeable battery and further including a charging port operably disposed within said housing and operably connected to said electronic device for recharging said battery.

4. The measuring tape of claim 1, wherein said wireless communication device includes one of Blue Tooth device, Bluetooth AptX device and AirPlay device.

5. The measuring tape of claim 1, which further includes a removable data electronic cable configured for allowing a source of audio data to download audio data to be received by and/or stored on said electronic device.

6. The measuring tape of claim 1, which further includes a microphone operably connected to said electronic device to permit recoding and storage of sound data.

* * * * *